United States Patent
Vincent et al.

(10) Patent No.: US 12,396,445 B2
(45) Date of Patent: Aug. 26, 2025

(54) ROPELESS FISHING SYSTEM AND METHOD

(71) Applicant: ROPELESS SYSTEMS, INC., Biddeford, ME (US)

(72) Inventors: Harold Vincent, North Kingstown, RI (US); Andrew Dunne, Saunderstown, RI (US); Hayden Radke, Charlestown, RI (US); Colin Vincent, Smithtown, NY (US); Timothy Alberg, Warwick, RI (US); Michael Dunne, Warwick, RI (US)

( * ) Notice: Subject to any disclaimer, the term of this patent is extended or adjusted under 35 U.S.C. 154(b) by 677 days.

(21) Appl. No.: 17/776,734

(22) PCT Filed: Nov. 13, 2020

(86) PCT No.: PCT/US2020/060604
§ 371 (c)(1),
(2) Date: May 13, 2022

(87) PCT Pub. No.: WO2021/097364
PCT Pub. Date: May 20, 2021

(65) Prior Publication Data
US 2022/0378026 A1    Dec. 1, 2022

Related U.S. Application Data

(60) Provisional application No. 62/934,566, filed on Nov. 13, 2019.

(51) Int. Cl.
*A01K 69/08* (2006.01)
*B63B 22/06* (2006.01)

(52) U.S. Cl.
CPC .............. *A01K 69/08* (2013.01); *B63B 22/06* (2013.01)

(58) Field of Classification Search
CPC ......... B63B 22/00; B63B 22/06; A01K 69/00; A01K 69/08
(Continued)

(56) References Cited

U.S. PATENT DOCUMENTS 3,722,014 A * 3/1973 Hill ...................... B63B 22/06
441/2
4,262,379 A    4/1981 Jankiewicz
(Continued)

FOREIGN PATENT DOCUMENTS

CN    102700683 A    10/2012

OTHER PUBLICATIONS

International Search Report in corresponding PCT application No. PCT/US2020/060604, Mar. 10, 2021, 3 pp.
(Continued)

*Primary Examiner* — Lars A Olson
(74) *Attorney, Agent, or Firm* — TREDECIM LLC; Sean L. Sweeney

(57) ABSTRACT

Disclosed herein are systems and methods for ropeless fishing. The ropeless fishing system includes a surface subsystem installed on a vessel and at least one submerged subsystem submerged in a body of water. The surface subsystem includes acoustic transceiver and acoustic transducer units, which are configured to generate and omnidirectionally transmit an acoustic interrogation signal into the body of water surrounding the vessel and to directionally receive acoustic reply signals. The submerged subsystems include a compressed gas source and an enclosed flotation bag in fluid communication and an underwater acoustic actuator-transponder unit configured to receive the acoustic interrogation signal transmitted by the surface subsystem and to transmit an acoustic reply signal into the body of water. In addition, the submerged subsystem is further
(Continued)

configured to control the flow of gas between the compressed gas source and the enclosed floatation bag to facilitate recovery of the submerged subsystem.

17 Claims, 9 Drawing Sheets

(58) Field of Classification Search
USPC .............................................. 441/2
See application file for complete search history.

(56) References Cited

U.S. PATENT DOCUMENTS

| | | |
|---|---|---|
| 10,375,939 B2 * | 8/2019 | Partan .................... B63B 22/06 |
| 2013/0109259 A1 | 5/2013 | Abulrassoul et al. |
| 2017/0332612 A1 | 11/2017 | Partan et al. |
| 2019/0110452 A1 | 4/2019 | Greenberg |

OTHER PUBLICATIONS

Written Opinion in corresponding PCT application No. PCT/US2020/060604, Mar. 10, 2021, 9 pp.
Extended Search Report in corresponding EPO application No. 20887452.9, Nov. 9, 2023, pp. 12.
Examination report in corresponding CIPO application No. 3160998, Aug. 3, 2023, pp. 4.
English translation of CN 102700683, pp. 6.

* cited by examiner

ROPELESS FISHING SYSTEM AND METHOD

CROSS-REFERENCE TO RELATED APPLICATIONS

This application claims the benefit of U.S. Provisional Application No. 62/934,566, filed Nov. 13, 2019, the disclosure of which is herein incorporated by reference.

BACKGROUND

1. Field of the Invention

This invention describes systems and methods to allow the ability to conduct certain fishing operations without the need for vertical lines and buoys attached to fixed fishing gear deployed below the sea surface or onto on the sea bottom.

2. Discussion of Background Information

Commercial fishing methods can be broadly classified as either "fixed" or "mobile." One class of fixed gear refers to the use of traps or cages to harvest certain species of crustaceans (lobsters, crabs) or shellfish (oysters, mussels). Other types of fixed gear include gill nets to entrap finfish. Mobile gear refers to the use of apparatus towed from moving vessels (bottom trawls, mid-water trawls, long line, clam and scallop dredges, etc.).

This invention focuses on fixed gear which traditionally employs vertical lines attached to surface floats to mark the location of the subsurface gear and allow for its retrieval. These vertical lines present a lethal hazard to marine animals, with particular devastation imparted to the critically endangered North Atlantic Right Whale (NARW), with rope entanglements having been attributed as the cause of death in 85% of all NARW fatalities.

Existing attempts to remove the traditional vertical lines attached to surface floats suffer from an inability to identify the fixed gear once it is deployed below the sea surface. For example, unmarked fixed gear is susceptible to being towed through by mobile gear fisheries (bottom trawl, scallop dredge, etc.) and set over by other fixed gear.

Ropeless fishing systems or buoyless fishing systems, referred to herein collectively as "ropeless fishing systems," take away the end line and buoy. However, in order for a ropeless fishing system to be practical, the functions of these components must be replaced. For example, in order to fully replace the existing vertical lines attached to surface floats, ropeless fishing systems should provide address the current role of surface floats by providing a means to identify the ownership of submerged fishing gear and marking the location of submerged fishing gear in order to prevent placement conflicts. In addition, ropeless fishing systems should also facilitate the retrieval of the submerged gear by its owner once the fishing gear is deployed on the seafloor.

One approach to ropeless fishing systems involves the use of float release systems such as those disclosed by Lloyd et al. in U.S. Pat. No. 7,534,152 ("Lloyd') and Abulrassoul et al. in US Publication No. 20130109259 ("Abulrassoul"). While such systems achieve the goal of avoiding lines with surface floats while the fishing gear is positioned on the seafloor, these systems fail to provide a means for the user to identify the location of the fishing gear once it is deployed. Accordingly, if the gear shifts due to tidal currents or is dragged by mobile fishing gear, there is no way for the owner to identify the new location of the fishing gear. In addition, these systems lack the ability for non-owners to ascertain the existence of fishing gear on the seafloor, increasing the likelihood that non-owners will tow-through or set over such systems.

Another example of an existing attempt at producing a ropeless fishing system is disclosed by Greenberg et al. in US Publication No. 20190110452 ("Greenberg"). Greenberg discloses a ropeless fishing system that uses acoustic sound waves to communicate with submerged fishing gear to enable lifting submerged fishing gear from the seafloor. However, Greenberg fails to address other significant features of traditional vertical-line-attached-to-surface-float systems such as providing a means to identify the location and the ownership of submerged fishing gear.

These existing technologies fail to adequately address the issues surrounding the requirements for ropeless fishing systems and methods to replace the traditional vertical line and surface float. For example, existing technologies lack the ability to accurately locate and plot the position of submerged fishing gear, do not provide the ability for fishermen to communicate with only their own submerged fishing gear, and do not provide regulators and law enforcement with the ability to monitor the use of submerged fishing gear.

While other devices and methods have been proposed for achieving the goal of ropeless fishing, none of these inventions, taken either singly or in combination, adequately address or resolve the aforementioned problems. Therefore, a need exists for an efficient system and method for ropeless fishing that addresses the need for direct communication, retrieval, underwater locating, and identification of submerged fishing gear, and allows for the results of the underwater positioning to be displayed on almost any modern, commercial chart plotter.

SUMMARY OF THE INVENTION

The present invention solves the problems associated with ropeless fishing and provides a reliable and efficient ropeless fishing system and method.

The present invention is directed to a ropeless fishing system that enables a single surface subsystem to communicate with multiple pieces of submerged fishing gear. The ropeless fishing system comprises a surface subsystem installed on a vessel, the surface subsystem comprising an acoustic transceiver unit in communication with an acoustic transducer unit, the surface subsystem configured to generate and omnidirectionally transmit an acoustic interrogation signal into a body of water surrounding the vessel and to directionally receive acoustic reply signals; and at least one submerged subsystem submerged in the body of water, each of the at least on submerged subsystem comprising a compressed gas source and an enclosed flotation bag in fluid communication and an underwater acoustic actuator-transponder unit configured to receive the acoustic interrogation signal transmitted by the surface subsystem and to transmit an acoustic reply signal into the body of water and further configured to control the flow of gas between the compressed gas source and the enclosed floatation bag. The acoustic transducer unit of the ropeless fishing system may further comprise a first transducer configured to directionally receive the acoustic reply signal and a second transducer configured to omnidirectionally transmit the acoustic interrogation signal. In addition, the surface subsystem may be further configured to process each acoustic reply signal generated by each of the at least one submerged subsystem and received by the surface subsystem to determine the location, ownership, and association of each of the at least one submerged subsystem and to display this location, ownership and association information to a user on a human machine interface.

The present invention is also directed to a method of ropeless fishing. The method comprises a first step of providing a ropeless fishing system comprising a surface subsystem installed on a vessel, the surface subsystem comprising an acoustic transceiver unit in communication with an acoustic transducer unit, the surface subsystem configured to omnidirectionally transmit an acoustic interrogation signal into a body of water surrounding the vessel and to directionally receive acoustic reply signals; and at least one submerged subsystem submerged in the body of water, each of the at least one submerged subsystem comprising a compressed gas source and an enclosed flotation bag in fluid communication and an underwater acoustic actuator-transponder unit configured to receive the acoustic signal transmitted by the surface subsystem and to transmit an acoustic signal into the body of water and further configured to control the flow of gas between the compressed gas source and the enclosed floatation bag. The surface subsystem generates and omnidirectionally transmits an acoustic interrogation signal, which is received by one of the at least one submerged subsystem. Once received, the acoustic interrogation signal is processed with the underwater acoustic actuator-transponder unit, which generates and transmits an acoustic reply signal. The acoustic reply signal is received with the surface subsystem, where the relative bearing of the acoustic reply signal is measured, and slant range and true bearing are calculated. The surface subsystem then calculates the location of the submerged subsystem. Where a plurality of submerged subsystems are deployed in the body of water, the steps of receiving and processing the acoustic reply signal and calculating the subsystem location are repeated for each acoustic reply signal received by the surface subsystem.

The method may further comprise generating and transmitting a second acoustic interrogation signal designed to cause one of the at least one submerged subsystem to rise to the surface of the body of water; receiving the second acoustic interrogation signal with the one of the at least one submerged subsystem; and processing the received acoustic interrogation signal with the underwater acoustic actuator-transponder unit and generating and transmitting a control signal that actuates a solenoid valve, causing gas from the compressed gas source to flow into and inflate the enclosed floatation bag and causing the one of the at least one submerged subsystem to rise to the surface of the body of water.

BRIEF DESCRIPTION OF THE DRAWINGS

These and other features, aspects and advantages of the present invention will become better understood with reference to the following description, appended claims, and accompanying drawings where:

DETAILED DESCRIPTION OF THE INVENTION

The present system and method is directed to the problem of ropeless fishing. Specifically, the present invention provides a system that replaces the functionality of traditional buoy and fixed line fishing systems and provides a method of use that allows for efficient and accurate communication between a vessel and submerged fishing gear, including the ability to identify the presence, ownership, location and association of said fishing gear, and the ability to cause said fishing gear to rise to the surface for retrieval.

The present invention addresses the problems surrounding ropeless fishing. Lost fishing gear is costly both due to the replacement cost of the gear and the fact that lost gear necessarily reduces the amount of fishing gear that is yielding a catch to the fisherman. In addition, where a fisherman chooses to allocate time to attempt to find lost fishing gear, the time spent searching reduces the time available to pull and set additional gear, further reducing the fishing yield. The present invention addresses these issues by providing a system of ropeless fishing that enables communication between the user and submerged fishing gear, including the ability to identify the presence, ownership, location and association of said fishing gear, and the ability to cause said fishing gear to rise to the surface for retrieval.

Figure 1:
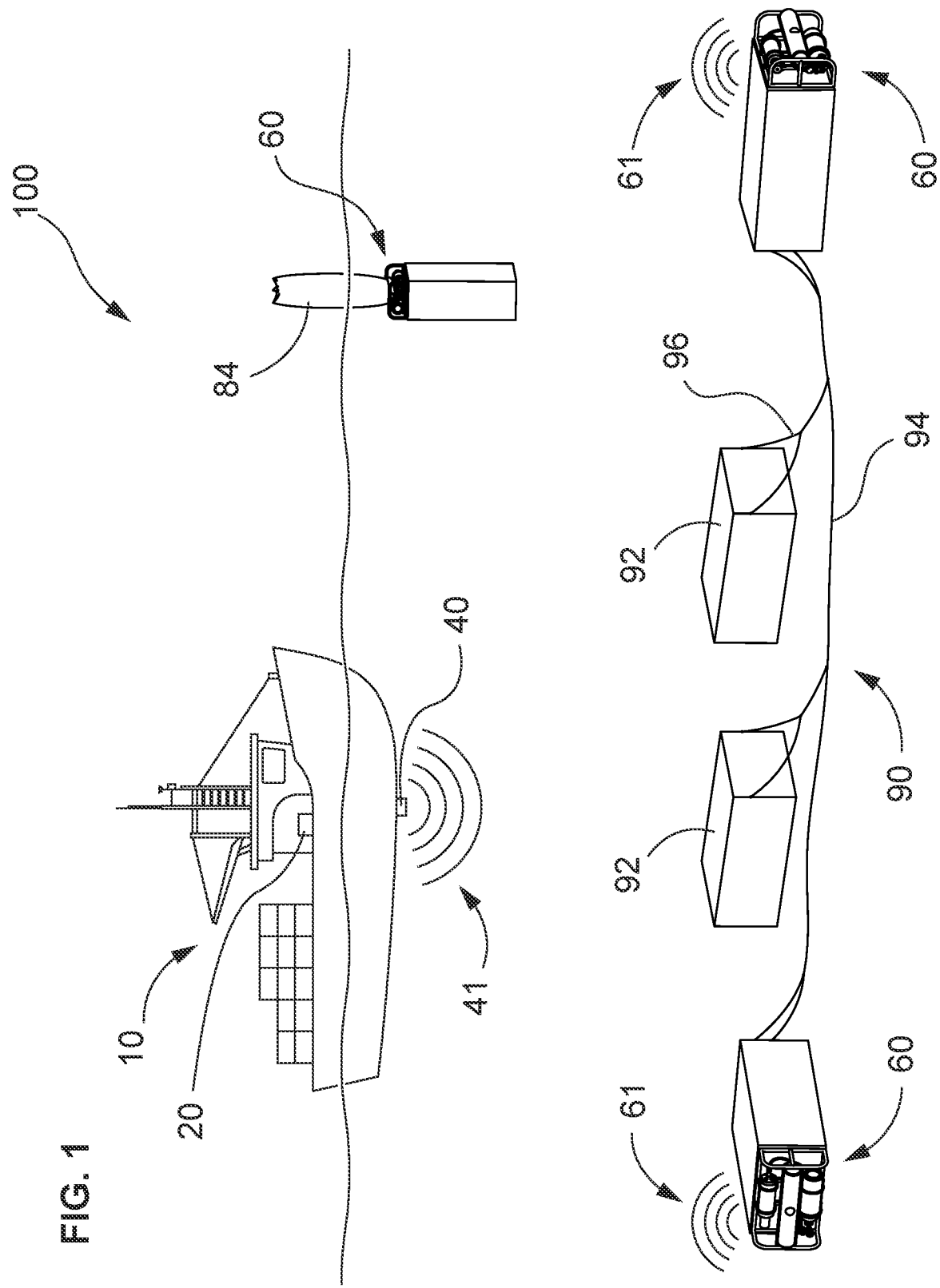
FIG. 1 depicts an embodiment of the system showing the component subsystems.

Turning to FIG. 1, an embodiment of the ropeless fishing system 100 of the present invention is shown. The ropeless fishing system 100 comprises two main subsystems: a surface subsystem 10 and a submerged subsystem 60. The ropeless fishing system 100 employs several methods to provide a complete implementation of a ropeless fishing system.

Figure 2:
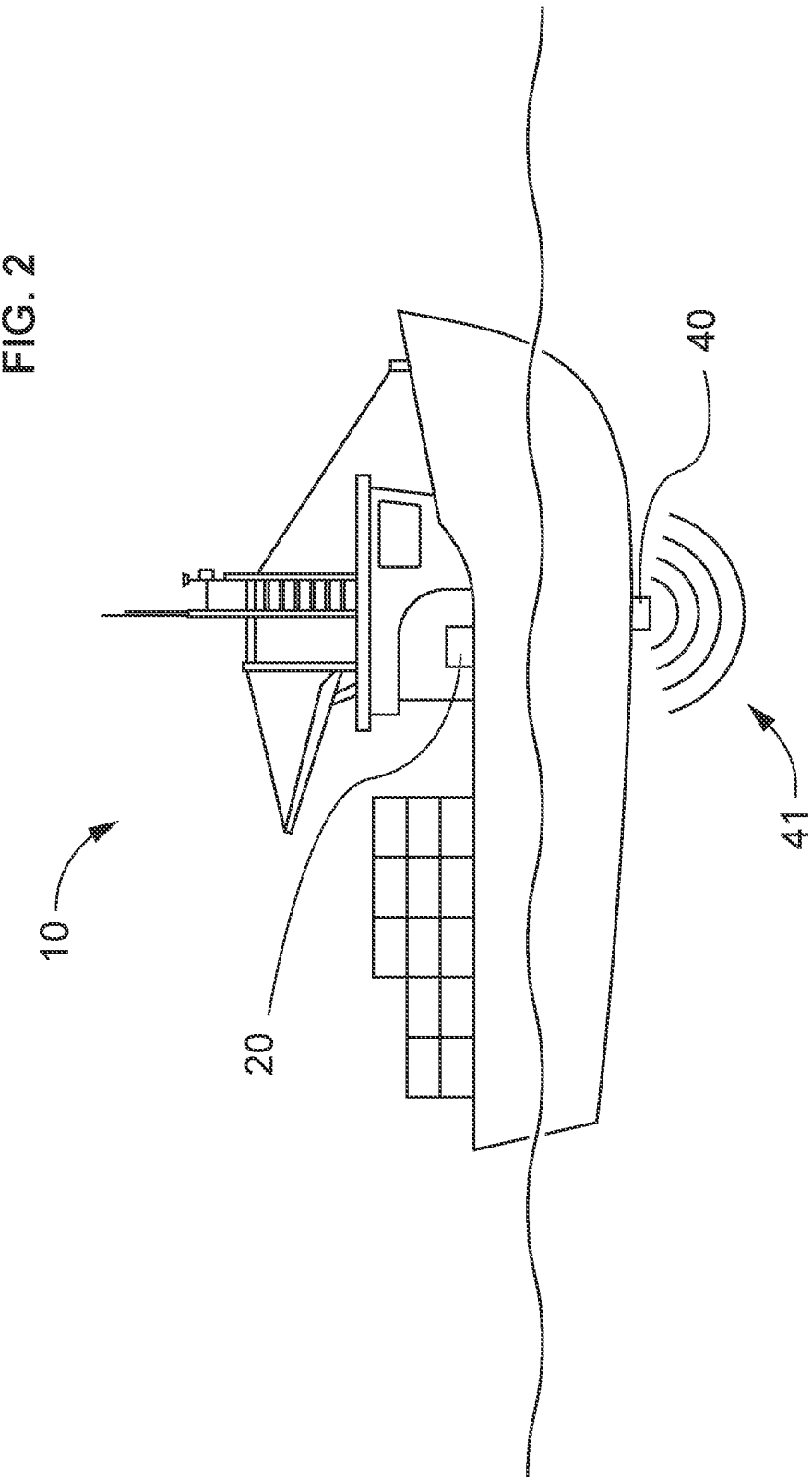
FIG. 2 depicts an embodiment of a component subsystem of the system.

Turning to FIG. 2, an embodiment of the surface subsystem 10 of the ropeless fishing system 100 is shown. The surface subsystem 10 is mounted on a vessel traversing the surface of a body of water. The surface subsystem 10 comprises an acoustic transceiver unit 20 and an acoustic transducer unit 40 and is capable of transmitting and receiving acoustic interrogation signals 41 to allow interrogation of multiple submerged subsystems 60 to determination the unique identification and location of each submerged subsystem 60 on the seafloor. In addition, the surface subsystem 10 is capable of commanding submerged subsystems 60 to rise to the surface for recovery.

Figure 3:
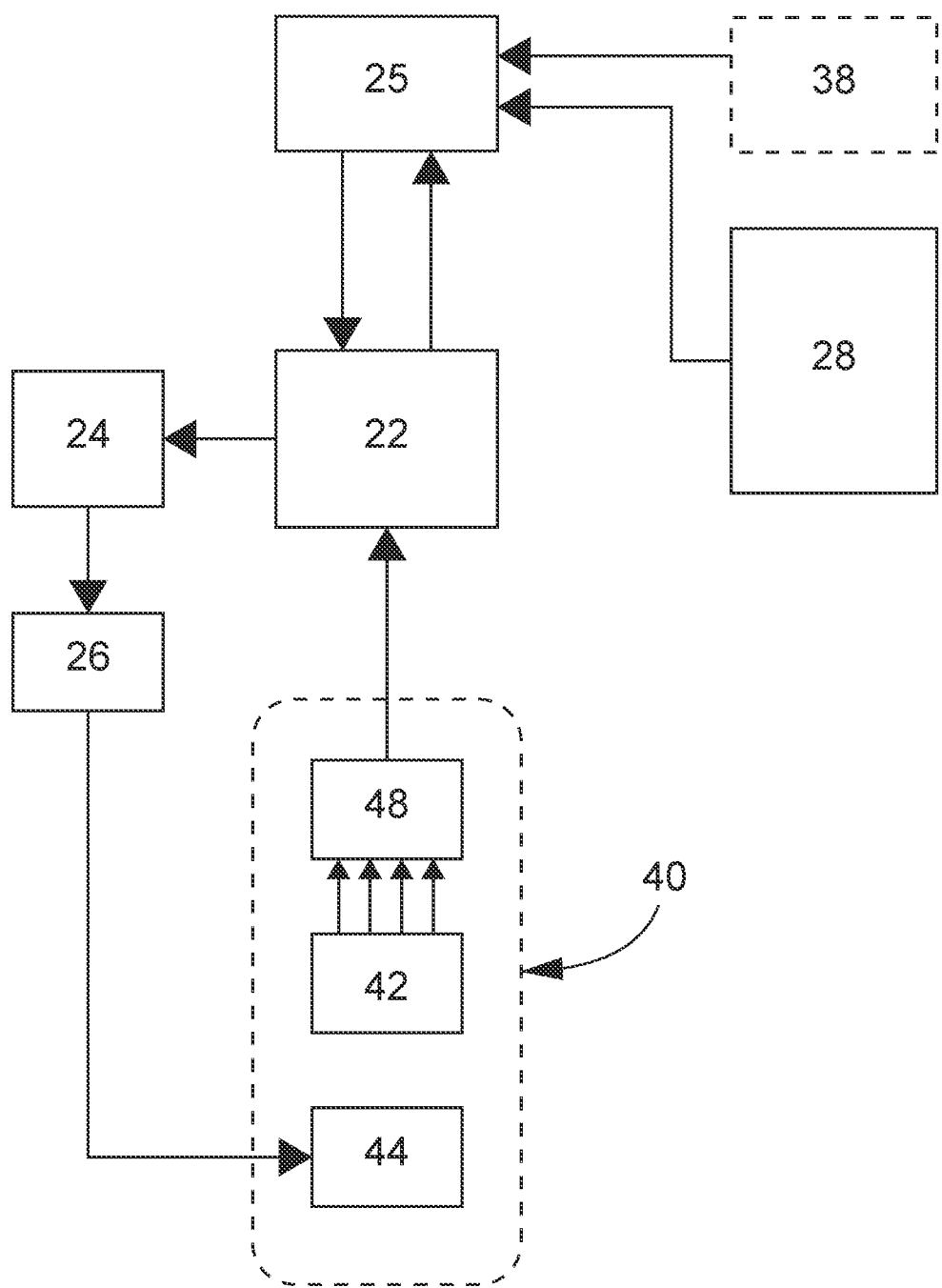
FIG. 3 depicts an electronic flow diagram of an embodiment of a component subsystem of the system.

The acoustic transceiver unit 20 is comprised of a group of electronic components that control the operation of the ropeless fishing system 100 and provide interaction with the user. As depicted in FIG. 3, the electronic components of the acoustic transceiver unit 20 include a microcontroller 22, which may be comprised of one or more printed circuit boards. The microcontroller 22 performs the processing functions of the surface subsystem 10, including generating interrogation signals 41, processing reply signals 61 to ascertain pertinent details of the responding submerged subsystems 60, enabling the graphic representation of submerged subsystem 60 details on a human machine interface 25, and processing input from a user in order to control the ropeless fishing system 100. The microcontroller 22 is in electronic communication with a power amplifier 24 which amplifies the electronic signal received from the microcontroller 25 and passes it to a tuning component 26 prior to passing the tuned electronic signal to a transducer 44 of the acoustic transducer unit 40 for conversion of the electronic signal to an acoustic signal. In addition, the microcontroller 22 receives electronic signals from the acoustic transducer unit 40, which may be processed to determine pertinent details regarding the submerged systems 60, such as location and bearing.

The microcontroller 22 is also in electronic communication with a human machine interface 25. The human machine interface 25 enables interaction between the user and the ropeless fishing system 100. Specifically, the human machine interface 25 includes a display capable of representing information regarding the submerged subsystems 60 of the ropeless fishing system 100. For example, the display may be a chart plotter capable of depicting the location and bearing of submerged subsystems 60. In addition to providing the ability to depict information regarding the submerged subsystems 60, the human machine interface 25 may provide an interface capable of allowing a user to control the ropeless fishing system 100. For example, the human machine interface 25 may be a touch-screen display capable of receiving user input to generate acoustic interrogation signals 41.

The human machine interface 25 may receive information from a GPS receiver 28 in order to determine information such as location and heading for the surface subsystem 10 and in order to calculate information regarding the submerged subsystems 60. As described in more detail below, the surface subsystem 10 may be used to determine the depth of the seafloor. However, in some embodiments it may be advantageous to include a dedicated depth sounder 38 to provide water depth information. It is noted that while the components of the acoustic transceiver unit 20 are depicted in FIG. 3 as separate, these components may be physically grouped in any manner without deviating from the scope of the present invention. For example, the human machine interface 25 may be a tablet computer that includes a GPS receiver and includes a portion of the microcontroller processing capability.

Figure 4B:
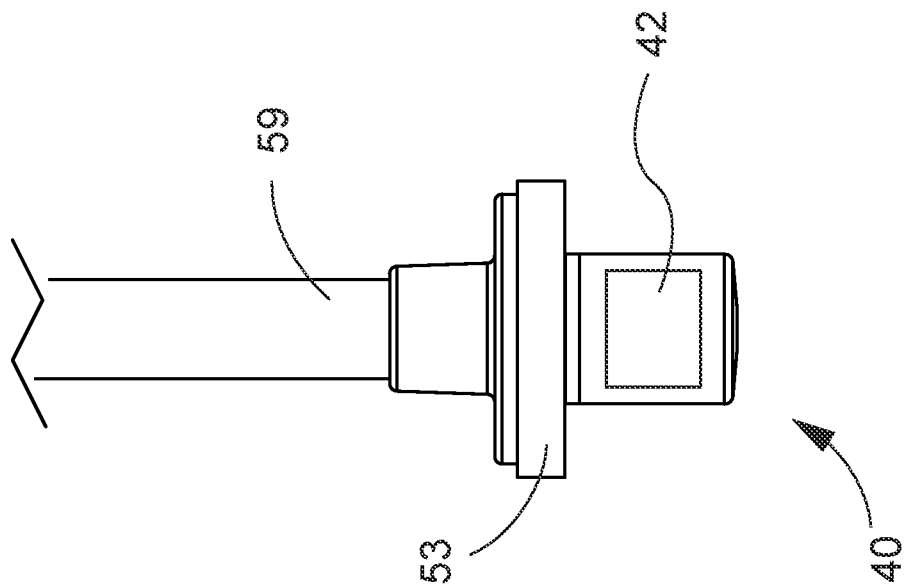
FIG. 4B depicts an embodiment of an acoustic transducer component of the system.
Figure 4A:
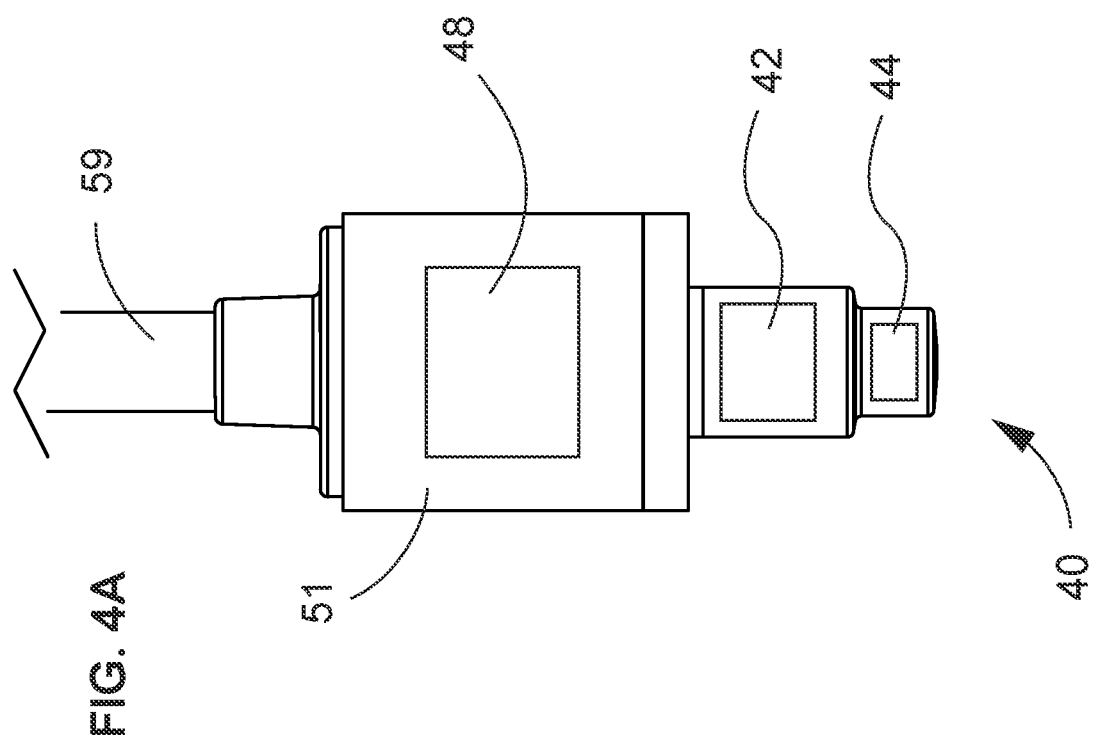
FIG. 4A depicts an embodiment of an acoustic transducer component of the system.

Turning the FIGS. 4A and 4B, two embodiments of the acoustic transducer unit 40 of the present invention are shown. The acoustic transducer unit 40 includes at least one transducer 42, which converts the electronic signal passed from the acoustic transceiver unit 20 into an acoustic signal that can be transmitted into the water. In embodiments where the acoustic transducer unit 40 comprises a single transducer 42, the transducer 42 performs the transmit function with regard to outgoing acoustic interrogation signals 41 and also the receive function with regard to incoming acoustic reply signals 61. When performing the receive function, the transducer 42 receives the acoustic reply signal 61 and converts the signal into an electronic signal that is passed back to the acoustic transceiver unit 20. Alternatively, in some embodiments, the acoustic transducer unit 40 includes a first transducer 42, which performs the receive function, and a second transducer 44, which performs the transmit function. Regardless of the number of transducers utilized in the acoustic transducer unit 40, the transmit function is omnidirectional in order to ensure that the acoustic interrogation signal 41 generated by the surface subsystem 10 is transmitted to all submerged systems 60 within range of the surface subsystem 10, while the receive function is directional in order to facilitate to calculation of submerged subsystem 60 information such as location and bearing.

In order to facilitate the directional receive function of the transducer 42, the acoustic transducer unit 40 is aligned such that the acoustic transducer unit 40 heading direction will coincide with the vessel heading direction. Further, because the transducers 42, 44 must be located below the waterline in order to function, the acoustic transducer unit 40 may include a conduit 59 to create a waterproof environment for the cables used to connect the components of the acoustic transceiver unit 20 and the components of the acoustic transducer unit 40. In addition, the acoustic transducer unit 40 may include a reply signal preamplifier 48 as shown in FIGS. 3 and 4A. In this configuration, the reply signal preamplifier 48, which is located within a housing 51, receives the electronic signal resulting from the first transducer 42 and amplifies the signal before passing it on the acoustic transceiver unit 20. Alternatively, a reply signal preamplifier 48 may be located elsewhere in the surface subsystem 10. For example, as depicted in FIG. 4B, the conduit may connect with a fitting 53 that enables a through-hull installation of the transducer 42 and the reply signal preamplifier 48 may be located within the hull of the vessel to provide additional protection for the electronics of the reply signal preamplifier 48.

Together, the acoustic transceiver unit 20 and the acoustic transducer unit 40 generate the outgoing acoustic interrogation signals 41 that will propagate from the surface vessel to multiple submerged subsystems 60 within range of the surface subsystem 10. The outgoing acoustic interrogation signal 41 may be a simple acoustic signal. However, preferably, the acoustic interrogation signal 41 is a coded acoustic signal that enables the surface subsystem 10 to communicate multiple parameters within a single acoustic interrogation signal 41. For example, a single acoustic interrogation signal 41 may include information concerning the identity of the surface subsystem 10 generating the acoustic interrogation signal 41 and information identifying the acoustic interrogation signal 41 as a request for a reply. The length and format of these coded acoustic interrogation signals 41 can be varied based on the size of the ropeless fishing system 100 and the desired level of security.

Upon receiving the acoustic interrogation signal 41 transmitted by the acoustic transducer unit 40 each submerged subsystem 60 can generate an acoustic reply signal 61. Similar to the acoustic interrogation signals 41, the acoustic reply signals 61 are preferably coded acoustic signals. These acoustic reply signals 61 are received by the surface subsystem 10 and processed to compute the position of each submerged subsystem 60 relative to the transducer 42. Where the acoustic reply signal 61 is a coded acoustic signal, the acoustic reply signal 61 can include information regarding the identification of the submerged system 60 and any association between multiple submerged subsystems 60 in order to allow the surface subsystem 10 to ascertain information regarding the submerged subsystem 60 such as ownership and the type of fishing gear deployed.

Once an acoustic reply signal 61 is received by the acoustic transducer unit 40, the acoustic signal is converted to an electrical signal and passed to the acoustic transceiver unit 20 for processing. The acoustic transceiver unit 20 computes the slant range by measuring the time of transmission from the acoustic transducer unit 20 until the time of reception of the acoustic reply signal 61 transmitted by the submerged subsystem 60. The outgoing acoustic interrogation signal 41 from the surface subsystem 10 to the submerged subsystem 60 can also be referred to as a downlink signal, while the acoustic reply signal 61 from the submerged subsystem 60 to the surface subsystem 10 can also be referred to as an uplink signal. Preferably, all of the acoustic signals utilized by the ropeless fishing system 100 are acoustic signals of short time duration and can be referred to as pings or pulses.

In addition to utilizing the acoustic reply signal 61 to compute the slant range of the submerged subsystem 60, the acoustic transceiver unit 20 can also use this signal to compute the relative bearing of the submerged subsystem 60. For example, where the acoustic transducer unit 40 is installed on the vessel such that the acoustic transducer unit 40 heading direction coincides with the surface vessel heading direction, the relative bearing is the angle from the ships heading to the direction of arrival of the acoustic reply signal 61.

As described above, the acoustic transceiver unit 20 is capable of receiving vessel location and heading information from a GPS receiver 28, which may be physically grouped with other components of the acoustic transceiver unit 20 or may be a separate, external GPS receiver 28. The acoustic transceiver unit 20 is further capable of receiving water depth information from a dedicated depth sounder 38 that is installed and configured to communicate its depth information to the acoustic transceiver unit 20. Alternatively, the acoustic transceiver unit 20 can directly calculate water depth by calculating the time delay of acoustic interrogation pulses 41 that have been reflected back to the acoustic transducer unit 40 as echoes off of the seafloor. In addition, where the ropeless fishing system 100 utilizes coded acoustic signals that include identification and association information, the acoustic transceiver unit 20 will be able to determine the identification, location and association of each submerged subsystem 60 with a single acoustic interrogation signal 41 and a single acoustic reply signal 61. Once these characteristics are identified, the acoustic transceiver unit 20 can determine not only location and bearing, but also the ownership of various submerged subsystems 60 as well as the nature of the fishing gear deployed on the seafloor, e.g., trawls or individual traps.

The acoustic transceiver unit 20 is capable of computing the geodetic location (lat, lon) of each submerged subsystem 60 using the slant range, relative bearing, water depth, vessel position and vessel heading. Once computed, the acoustic transceiver unit 20 will transmit the submerged subsystem 60 information, including geodetic location, depth, apparatus type, and apparatus ownership, to the human machine interface 25. Preferably, this information is then presented on a display so the user can make informed decisions regarding gear deployment and retrieval.

Figure 5:
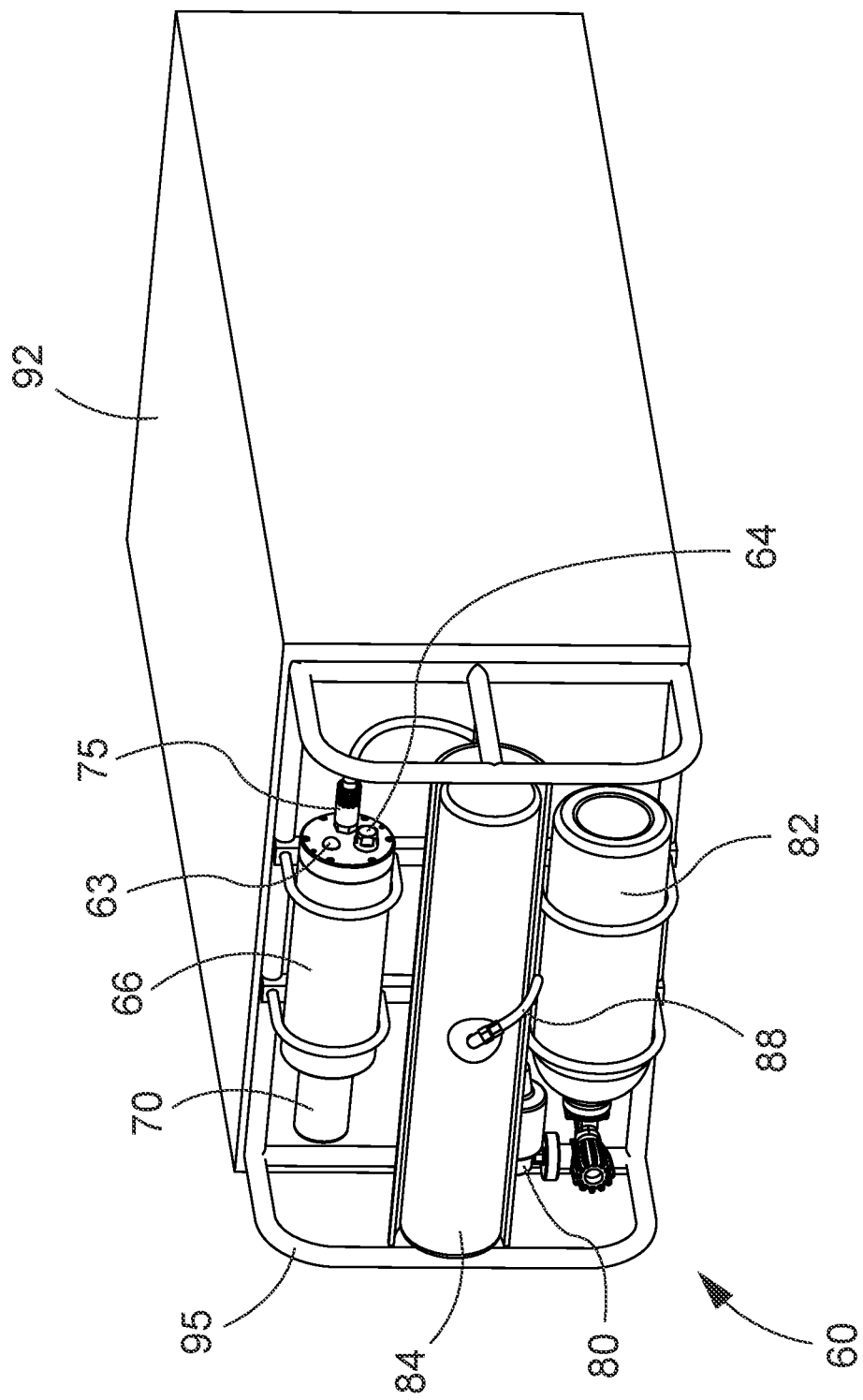
FIG. 5 depicts an embodiment of a component subsystem of the system.
Figure 6:
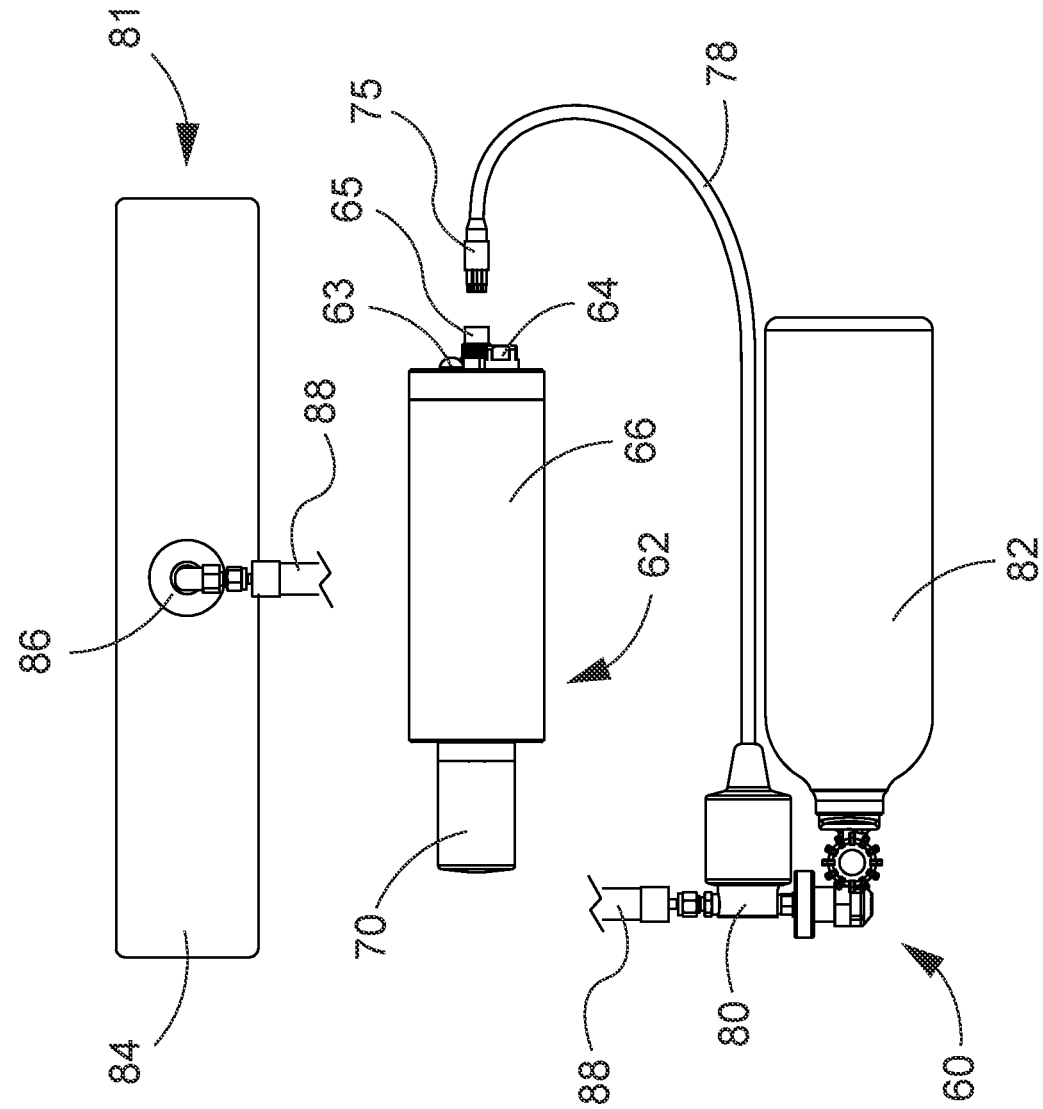
FIG. 6 depicts an embodiment of the submerged apparatus subsystem of the system.
Figure 7:
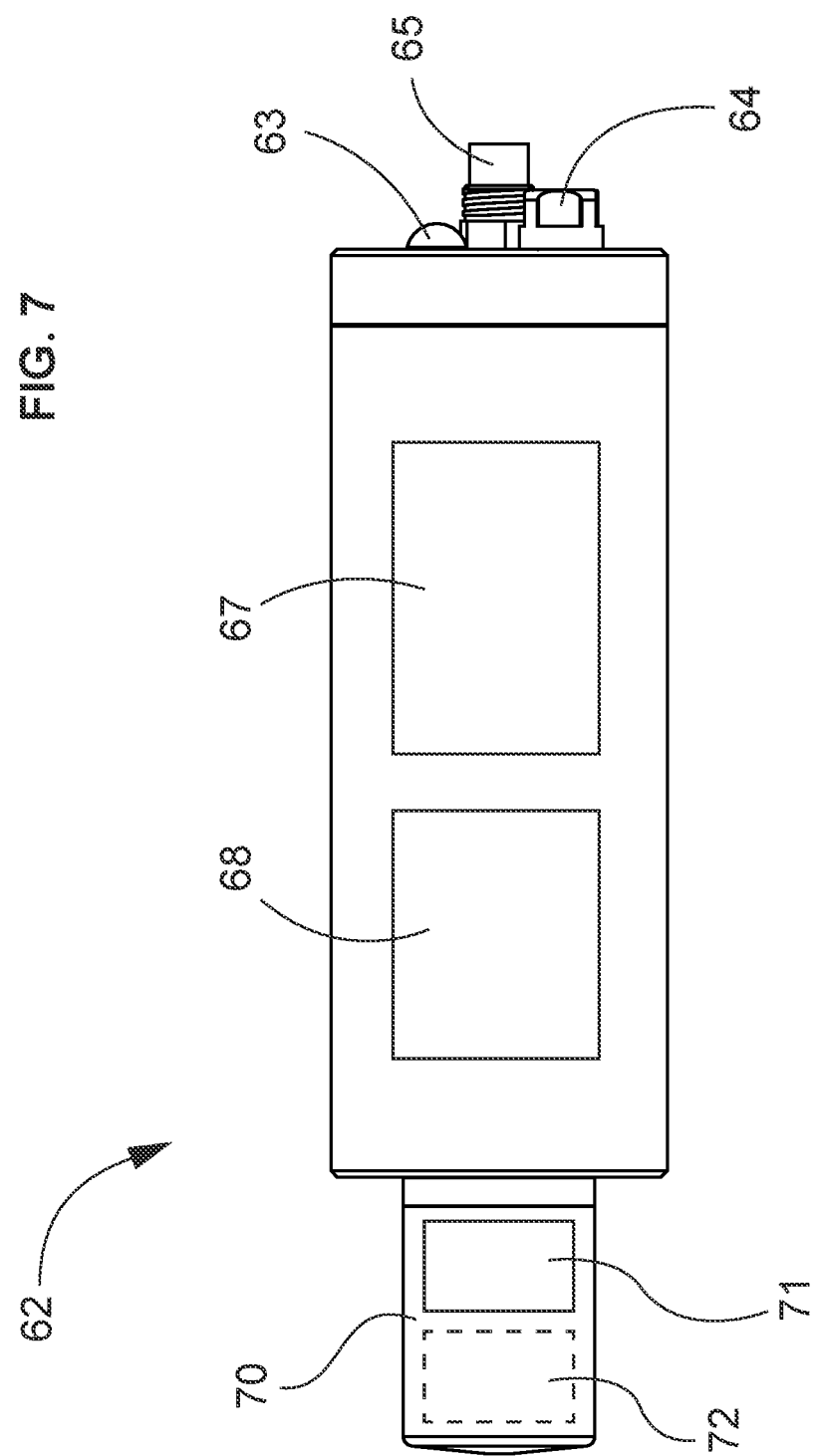
FIG. 7 depicts an embodiment of the underwater acoustic actuator-transponder unit of the system.

Turning to FIGS. 5-7, exemplar embodiments of the submerged subsystem 60 and the underwater acoustic actuator-transponder unit (UAAT) 62 of the ropeless fishing system 100 of the present invention are depicted. The submerged subsystem is comprised of three components: a UAAT 62, a compressed gas source 82, and an enclosed flotation bag 84.

The UAAT 62 performs the function of communicating with the surface subsystem 10 by receiving the acoustic interrogation signal 41 and transmitting the acoustic reply signal 61. In addition, the UAAT 62 also controls the release of gas from the compressed gas source 82 in order to inflate the enclosed flotation bag 84. The UAAT 62 includes a housing 66 and a transducer portion 70. The transducer portion 70 includes at least one transducer 71. Similar to the acoustic transducer unit 40 described above, the UAAT 62 may utilize a single transducer 71 that performs the receive function with regard to incoming interrogation signals 41 and the transmit function with regard to outgoing reply signals 61. Alternatively, the UAAT 62 may include a first transducer 71, which performs the receive function, and a second transducer 72, which performs the transmit function.

The housing 66 is waterproof and submersible in order to protect the electronic components that comprise an acoustic signal processor and valve control unit (ASP-VCU) 68 and an energy source 67 such has a battery. In addition, the housing may include an LED 63, which provides the ability to signal the status of the UAAT to the user without requiring the user to open the housing 66, a vacuum port 64, which enables air to be removed from the housing 66 in order to create a vacuum, and a multi-control port 65 which enables communication with the ASP-VCU 68 and the power source 68.

The transducer portion 70 is connected to the housing 66 in a manner that maintains the waterproof and submersible nature of the housing 66 and enables the transducers 71, 72 to remain in electronic communication with the ASP-VCU 68. While the transducers 71, 72 are depicted in a transducer portion 70 that is directly connected to the housing 66, the transducers may also be positioned away from the housing provided the transducers 71, 72 remain in electronic communication with the ASP-VCU 68.

The ASP-VCU 68 is comprised of a microcontroller and one or more electronic components that process the electronic signals received from and transmitted to the transducers 71, 72, control the power supply, and control the operation of a solenoid valve 80. When an acoustic interrogation signal 41 is received by the transducer 71, the acoustic signal is converted to an electronic signal by the transducer 71 and then passed to the ASP-VCU 68 for processing. The processing performed by the ASP-VCU can also include amplification and interpretation of the electronic signal. In addition, depending on the nature of the acoustic interrogation signal 41, the ASP-VCU 68 can either generate a reply signal or operate a solenoid valve 80. As described above with regard to interrogation signals, the reply signal generated by the ASP-VCU 68 can be a coded signal and can include information regarding the identification and association of the submerged subsystem 60.

The multi-control port 65 enables communication with the ASP-VCU 68 and the power source 67. As depicted in FIGS. 5 and 6, a control cable 78 is connected to the multi-control port 65 via a connector 75. In this configuration, the connector 75 creates an electronic connection between the ASP-VCU 68 and the power source 67 inside the housing 66 and the solenoid valve 80, such that the ASP-VCU 68 can control the operation of the solenoid valve 80. In addition, the connector 75 can function as an activation switch for the UAAT 62 by creating the necessary electric connection between the power source 67 and the ASP-VCU 68 once the connector 75 is secured to the multi-control port 65. In alternative configurations, the multi-control port 65 can be connected to a separate cable for the purposes of testing and reprogramming the ASP-VCU 68 and charging the battery 67.

In some situations, it is advantageous to create a vacuum inside the chamber in order to minimize the possibility of condensation inside the housing 66. Accordingly, a vacuum port 64 may be included on the housing. In addition to minimizing the risk of condensation, creating a vacuum inside the housing 66 can also be used to test the integrity of the housing 66. For example, a sensor can be included within the ASP-VCU 68 to detect when the housing 66 has lost vacuum, which can be used to activate the LED 63 to indicate a system error.

The UAAT 62 is connected to the solenoid valve 80 via the control cable 78. The solenoid valve is also connected to the compressed gas cylinder 82 and the enclosed floatation bag 84 such that the solenoid valve 80 controls the follow of gas between the compressed gas cylinder 82 and the enclosed floatation bag 84. When the UAAT 62 receives an acoustic interrogation signal 41 designed to cause the submerged subsystem 60 to rise to the surface of the water, a signal is generated by the ASP-VCU 68 and transmitted from the UAAT 62 to the solenoid valve 80 via the control cable 78. The signal causes the actuation of the solenoid valve 80 and permits gas to flow from the compressed gas cylinder 82 into a gas line 88 connecting the solenoid valve 80 and the enclosed floatation bag 84. As the compressed gas fills the enclosed floatation bag 84, the submerged subsystem 60 is lifted from the seafloor and floats to the surface for recovery.

Although the solenoid valve 80 is depicted as being external to the housing 66 of the UAAT 62, alternatively, the solenoid valve 80 may be located within the housing 66. In configurations where the solenoid valve 80 is located within the housing 66, the housing 66 may further include inlet and outlet ports for the gas line 88. In this configuration, the gas line 88 may be connected to the inlet and outlet ports such that the compressed gas source 82 and the enclosed floatation bag 84 are placed in fluid communication via the solenoid valve 80 located within the housing.

The compressed gas source 82 may be any appropriate pressure vessel containing compressed gas. Further, the compressed gas may be any compressed gas known in the art, including air, carbon dioxide, nitrogen, oxygen, or helium. The compressed gas source 82 may or may not include a manually operated valve. For example, the compressed gas source may be a carbon dioxide cartridge that may get pierced upon connection to the solenoid valve 80.

The enclosed floatation bag 84, which is also known in the art as a lift bag or a balloon, may include a pressure relief valve. The pressure relief valve can help prevent rupture, tearing, or other damage that would cause gas leaks upon complete inflation or gas expansion due to reduced hydrostatic pressure during ascent, limiting the risk that damage resulting from overinflation would cause release of gas from the enclosed floatation bag 84 and reduce buoyancy and lift capacity. The enclosed floatation bag 84 has an inlet port 86 to accept compressed gas into the bladder to allow expansion and generation of lifting (buoyancy) forces.

The volume of the enclosed floatation bag 84 and the compressed gas source 82 can be varied to create sufficient lifting forces to bring the submerged subsystem to the surface for retrieval. For example, a typical 19 cu. ft. compressed gas SCUBA cylinder would provide enough air to fully inflate a 500 pound enclosed floatation bag 84 at a depth of 80 feet of seawater, while a standard 80 cu. ft. compressed gas SCUBA cylinder would provide the ability to inflate the same size 500 pound enclosed floatation bag 84 to a depth of 338 feet of seawater.

As shown in FIG. 5, the submerged subsystem 60 is attached to a piece of fishing gear, such as a trap. In order to protect the components of the submerged subsystem 60, the submerged subsystem 60 may be attached to and surrounded by a frame 95, with the submerged subsystem attached to the fishing gear 92 via the frame 95. In addition, where multiple pieces of fishing gear 92 are deployed as a trawl 90, not all of the fishing gear 92 may include a submerged subsystem 60. Preferably, fishing gear 92 deployed as a trawl 90 will include a submerged subsystem 60 at each end of the trawl 90 as depicted in FIG. 1. In this configuration, it is also preferable that both of the submerged subsystems 60 utilized in the trawl 90 include an association indicator in their acoustic reply code 61, which will allow the surface subsystem 10 to identify that the two submerged subsystems 60 represent the ends of a trawl 90.

Turning to a method of using the ropeless fishing system 100 to identify the position of submerged subsystems 60, a surface subsystem 10 comprises an acoustic transceiver unit 20 and an acoustic transducer unit 40 located on a vessel operating at the surface of the water. As previously described, the acoustic transceiver unit 20 is connected to the acoustic transducer unit 40. The acoustic transceiver unit 20 generates an electronic interrogation signal that is transmitted through a power amplifier 24 and a tuning component 26 to a transducer 44, where the electronic interrogation signal is converted to an acoustic interrogation signal 41 that is transmitted into the ocean as an omnidirectional acoustic signal. This acoustic interrogation signal 41 is reflected back from the seafloor as an echo and can be processed by the surface subsystem 10 to obtain depth in a manner similar to a traditional echosounder or fathometer. In addition, the acoustic interrogation signal 41 is also received by the UAAT 62 of each submerged subsystem 60 within range of the surface subsystem 10, which will result in the UAAT 62 generating and transmitting an acoustic reply signal 61 that is sent back to the surface apparatus 10. Acoustic reply signals 61 are by necessity different than the acoustic interrogation signals 41. However, acoustic reply signals 61 may also be different between each submerged subsystem 60. The echoes of the acoustic interrogation signal 41 and the acoustic reply signals 61 are received by the surface subsystem 10, where the acoustic signals are converted to electronic signals by the transducer 42 and transmitted to the acoustic transceiver unit 20 for processing.

Using the speed of sound in water, the time of the acoustic reply signals 61 can be converted to the geometric slant range between the acoustic transducer unit 40 and the submerged subsystem 60. The acoustic transducer unit 40 receives the acoustic reply signal 61 by means of a receiving hydrophone. The receiving hydrophone is directional such that it can allow measurement of the angle of arrival in azimuth of the signal over the full 360 degrees around the transducer 42. By installing the acoustic transducer unit 20 such that the acoustic transducer unit 40 heading direction will coincide with the vessel heading direction, the measurement of the angle of arrival produces a measurement of relative bearing of the submerged subsystem 60 from the surface vessel.

Once the acoustic transceiver unit 20 has calculated the slant range (R), relative bearing ($\theta_R$), heading (H) and depth (d), the position of the submerged subsystem 60 can be computed as follows:

1. Compute the horizontal distance (h) between the submerged subsystem 60 and acoustic transducer unit 40 according to:

$$h=\sqrt{R^2-d^2}$$

Figure 8:
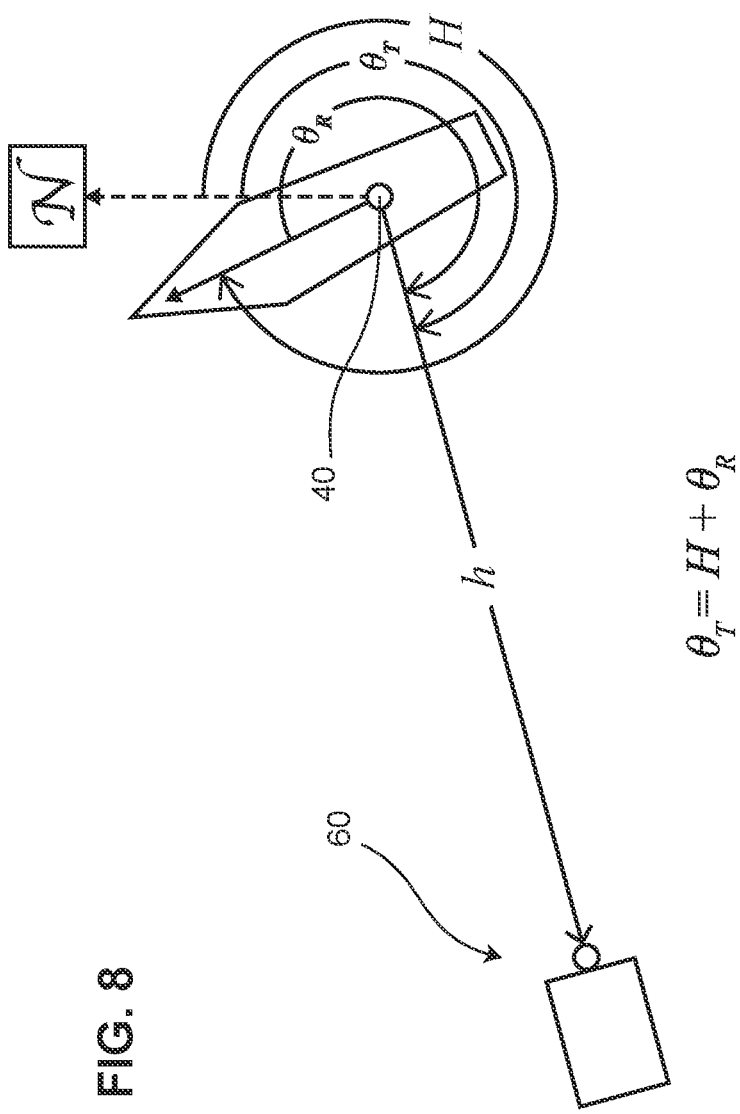
FIG. 8 depicts a graphical representation of the geometry associated with the equations used in connection with an embodiment of the method of the present invention.

2. Compute the true bearing ($\theta_T$) from the relative bearing and heading.
3. Compute the Latitude ($\phi$) and Longitude ($\lambda$) according to:

$$\phi_B = \phi_S + \frac{h \sin \theta_T}{R_E}$$

$$\lambda_B = \lambda_S + \frac{h \cos \theta_T \cos \phi_S}{R_E}$$

Where ($\phi_B$, $\lambda_B$) is the latitude and longitude of the submerged subsystem 60, and ($\phi_S$, $\lambda_S$) is the latitude and longitude of the acoustic transducer unit 40. Note that this is a simplified computation sufficiently accurate over short distances and for this application. We could alternatively implement a solution using the Vincenty algorithm. FIG. 8 provides a graphical depiction of the geometry associated with the equations written in this section.

Figure 9:
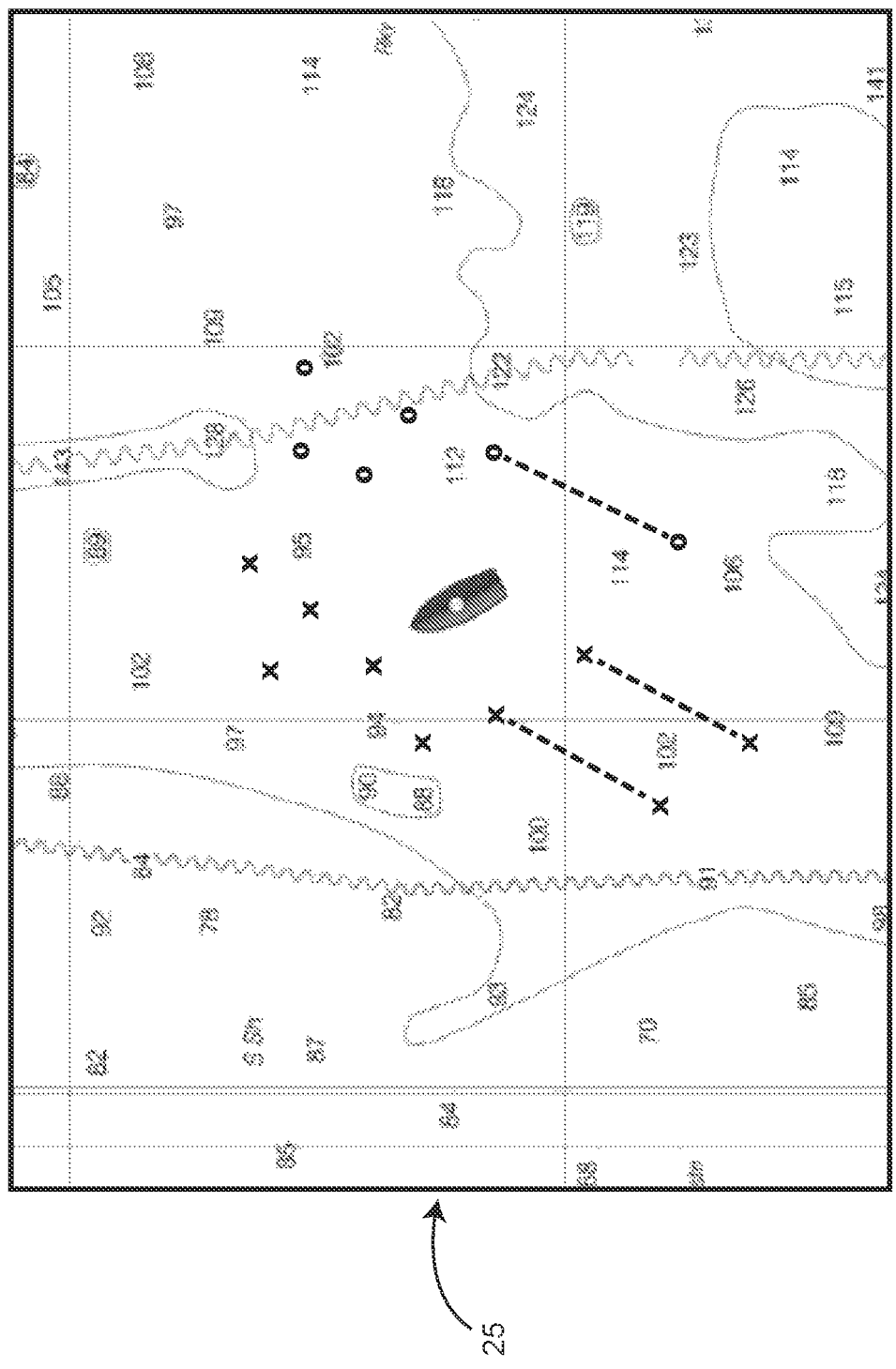
FIG. 9 depicts an example of a display depicting submerged subsystem information.

After computing the latitude and longitude of a submerged subsystem 60, the acoustic transceiver unit 20 can display the information via the human machine interface 25. For example, the information may be transmitted in NMEA-2000 or NMEA-0183 format and presented on a display as shown in FIG. 9. Furthermore, the information could be sent as a Waypoint or as an AIS message. Alternatively, the information can include the identification and association information transmitted in the acoustic interrogation signal 41 and the acoustic reply signal 61 to display submerged fishing gear as individual traps and trawls, with relevant ownership information, on properly modified chart plotting software.

Utilizing coded acoustic reply signals 61 provides the ability to differentiate between different submerged subsystems 60 in situations where a plurality of submerged subsystems 60 are deployed in a given area of the seafloor. This differentiation can be used to identify which submerged subsystems 60 are owned by the operator or can be used by regulators and law enforcement to identify the ownership of submerged subsystems deployed on the seafloor.

Where fishing gear 92 is deployed on the seafloor as a trawl 90, the trawl 90 may utilizes a submerged subsystem 60 at each end of the trawl 90. Each of these submerged subsystems 60 may be coded to transmit an acoustic reply signal 61 that allows the surface subsystem 10 to identify the submerged subsystems 60 as connected and the appropriate message can be displayed on the human machine interface 25 to represent the location of submerged subsystems 60 with a string of fishing gear 92 connected between them.

Turning to FIG. 9, an example of a display portion of the human machine interface 25 depicting location, ownership and association information of a plurality of submerged subsystems 60 is shown. In the example, the location information determined by the surface subsystem 10 is used to plot each submerged subsystem 60 within range of the surface subsystem 10. In addition, identification information provided by each submerged subsystem 60 is represented as an "o" where the submerged subsystem 60 is owned by the user, while each submerged subsystem 60 is represented by an "x" where the submerged subsystem is owned by someone other than the owner. Finally, association information is represented by the dashed line connecting submerged subsystem 60, which indicates that the submerged subsystems 60 are connected to form a trawl 90. It will be understood that this example represents only one means of displaying the information ascertained by the surface subsystem 10, and that different symbols, colors or other indicators could be used to similar effect.

Turning to a second method of the present invention, the surface subsystem 10 can be used to signal the submerged subsystem 60 to inflate the enclosed floatation bag 84, causing the submerged subsystem 60 to float to the surface for recovery. A first step includes utilizing an acoustic interrogation signal 41 to compute the location of one or more submerged subsystems 60 as described above. Once the one or more submerged subsystems 60 are located, a second acoustic interrogation signal 61 can be transmitted by the acoustic transponder unit 40. This second acoustic interrogation signal 61 can be coded such that it includes a code designed to instruct the submerged subsystem 60 to inflate the enclosed floatation bag 84. Upon receipt of this second coded interrogation signal 61 by each submerged subsystem 60, the solenoid valve 80 is actuated, allowing gas from the compressed gas source 82 to the enclosed floatation bag 84. As the gas fills the enclosed floatation bag 84, the submerged subsystem 60 is lifted from the seafloor and floats to the surface for retrieval.

In some situations, it is advantageous to embed additional information in the coded acoustic interrogation signal 41 in order to restrict the communication of the acoustic interrogation signal 41 to specific submerged subsystems 60 or a specific group of submerged subsystems 60. Therefore, the second acoustic interrogation signal 41 may be coded such that the acoustic interrogation signal 41 is targeted to a specific submerged subsystem 60 and includes a code designed to instruct the targeted submerged subsystem 60 to inflate its enclosed floatation bag 84. Further, where a user desires to instruct multiple submerged subsystems 60 to rise to the surface, multiple second interrogation signals 41 may be transmitted by the acoustic transponder unit 40, with each acoustic interrogation signal 41 coded to instruct an individual submerged subsystem 60.

Where a targeted acoustic interrogation signal 41 is received by the appropriate submerged subsystem 60, the submerged subsystem 60 will trigger the actuation of the solenoid valve 80 and the submerged subsystem 60 will float to the surface. However, where the targeted acoustic interrogation signal 41 is received by a submerged system 60 that is not a target submerged subsystem 60, the acoustic interrogation signal 41 will not result in the actuation of the solenoid valve and the non-targeted submerged subsystem 60 will remain on the seafloor.

It will be understood that the methods described herein enable a user to generate a single acoustic interrogation signal 41, which is broadcast in an omnidirectional pattern from the surface subsystem 10 and receive multiple acoustic reply signals 61, each reply signal representing an individual submerged subsystem 60 within range of the surface subsystem 10. Accordingly, location, identification, and association information can be ascertained and/or calculated for each of the acoustic reply signals 61 received by the surface subsystem 10. In practice, this efficient communication method, which obtains information regarding multiple submerged subsystems with a single outbound acoustic signal, precludes the need for the vessel to maneuver and minimizes the total number of acoustic transmissions present in the water.

It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A ropeless fishing system comprising:
   a. a surface subsystem installed on a vessel, the surface subsystem comprising an acoustic transceiver unit in communication with an acoustic transducer unit, the surface subsystem configured to generate and omnidirectionally transmit a first acoustic interrogation signal into a body of water surrounding the vessel and further configured to directionally receive acoustic reply signals; and
   b. at least one submerged subsystem submerged in the body of water, each of the at least one submerged subsystem comprising a compressed gas source and an enclosed flotation bag in fluid communication and an underwater acoustic actuator-transponder unit configured to receive the acoustic interrogation signal transmitted by the surface subsystem and to transmit an acoustic reply signal into the body of water and further configured to control the flow of gas between the compressed gas source and the enclosed floatation bag;
   c. the surface subsystem further configured to process each acoustic reply signal by the or each submerged subsystem and received by the surface subsystem to determine the location, ownership, and association of the or each submerged subsystem and to generate and transmit a second acoustic interrogation signal, the second acoustic interrogation signal causing the or at least one submerged subsystem to rise to the surface of the body of water.

2. The ropeless fishing system of claim 1 wherein the acoustic transducer unit comprises a first transducer configured to directionally receive the acoustic reply signal and a second transducer configured to omnidirectionally transmit the acoustic interrogation signal.

3. The ropeless fishing system of claim 1 wherein the at least one submerged subsystem is a plurality of submerged subsystems.

4. The ropeless fishing system of claim 1 wherein the acoustic interrogation signal and the acoustic reply signal are coded acoustic signals that include information regarding identification and any association between multiple submerged subsystems.

5. The ropeless fishing system of claim 1 wherein the location, ownership and association of each of the at least one submerged subsystem is displayed to a user on a human machine interface.

6. The ropeless fishing system of claim 1 wherein the second acoustic interrogation signal is targeted to a specific submerged subsystem.

7. A method of ropeless fishing comprising:
   a. providing a ropeless fishing system comprising:
      i. a surface subsystem installed on a vessel, the surface subsystem comprising an acoustic transceiver unit in communication with an acoustic transducer unit, the surface subsystem configured to omnidirectionally transmit a first acoustic interrogation signal into a body of water surrounding the vessel and further configured to directionally receive acoustic reply signals; and
      ii. at least one submerged subsystem submerged in the body of water, each of the at least one submerged subsystem comprising an underwater acoustic actuator-transponder unit configured to receive the acoustic signal transmitted by the surface subsystem and to transmit an acoustic signal into the body of water and further configured to control the flow of gas between a compressed gas source and an enclosed floatation bag;
      iii. the surface subsystem further configured to process each acoustic reply signal by the or each submerged subsystem and received by the surface subsystem to determine the location of the or each submerged subsystem and to generate and transmit a second acoustic interrogation signal, the second acoustic interrogation signal causing the or at least one submerged subsystem to rise to the surface of the body of water;
   b. generating and omnidirectionally transmitting an acoustic interrogation signal with the surface subsystem;
   c. receiving the acoustic interrogation signal with one of the at least one submerged subsystem;
   d. processing the received acoustic interrogation signal with the underwater acoustic actuator-transponder unit and generating and transmitting an acoustic reply signal;
   e. receiving the acoustic reply signal with the surface subsystem;
   f. measuring a relative bearing of the acoustic reply signal and calculating slant range and true bearing;
   g. calculating the location of the submerged subsystem
   h. generating and transmitting a second acoustic interrogation signal with the surface subsystem;
   i. receiving the second acoustic interrogation signal with one of the at least one submerged subsystem;
   j. processing the received second acoustic interrogation signal with the underwater acoustic actuator-transponder unit and generating and transmitting a control signal that actuates a solenoid valve, causing gas from the compressed gas source to flow into and inflate the enclosed floatation bag and causing the one of the at least one submerged subsystem to rise to the surface of the body of water.

8. The method of ropeless fishing of claim 7 wherein the surface subsystem further comprises a human machine interface having a display and further comprising displaying the location of the submerged subsystem to a user on the human machine interface.

9. The method of ropeless fishing of claim 7 wherein the at least one submerged subsystem is a plurality of submerged subsystems and wherein the acoustic interrogation signal is received by a plurality of the plurality of submerged subsystems.

10. The method of ropeless fishing of claim 9 wherein steps e though g are repeated for each acoustic reply signal received from each of the plurality of submerged subsystems.

11. The method of claim 10 further comprising the step of displaying the location of each of the plurality of submerged subsystems to a user on the human machine interface.

12. The method of ropeless fishing of claim 9 further comprising retrieving the one of the at least one submerged subsystem once the submerged subsystem rises to the surface of the body of water.

13. A method of ropeless fishing comprising:
   a. providing a ropeless fishing system comprising:
      i. a surface subsystem installed on a vessel, the surface subsystem comprising an acoustic transceiver unit in communication with an acoustic transducer unit, the surface subsystem configured to omnidirectionally transmit a first acoustic interrogation signal into a body of water surrounding the vessel and further configured to directionally receive acoustic reply signals; and ii. at least one submerged subsystem submerged in the body of water, each of the at least one submerged subsystem comprising an underwater acoustic actuator-transponder unit configured to receive the acoustic signal transmitted by the surface subsystem and to transmit an acoustic signal into the body of water; and iii. the surface subsystem further configured to process each acoustic reply signal by the or each submerged subsystem and received by the surface subsystem to determine the location of the or each submerged subsystem and to generate and transmit a second acoustic interrogation signal, the second acoustic interrogation signal causing the or at least one submerged subsystem to rise to the surface of the body of water;

b. generating and omnidirectionally transmitting an acoustic interrogation signal with the surface subsystem;

c. receiving the acoustic interrogation signal with one of the at least one submerged subsystem;

d. processing the received acoustic interrogation signal with the underwater acoustic actuator-transponder unit and generating and transmitting an acoustic reply signal;

e. receiving the acoustic reply signal with the surface subsystem;

f. measuring a relative bearing of the acoustic reply signal and calculating slant range and true bearing;

g. calculating the location of the submerged subsystem.

14. The method of ropeless fishing of claim 13 wherein the surface subsystem further comprises a human machine interface having a display and further comprising displaying the location of the submerged subsystem to a user on the human machine interface.

15. The method of ropeless fishing of claim 13 wherein the at least one submerged subsystem is a plurality of submerged subsystems and wherein the acoustic interrogation signal is received by a plurality of the plurality of submerged subsystems.

16. The method of ropeless fishing of claim 15 wherein steps e though g are repeated for each acoustic reply signal received from each of the plurality of submerged subsystems.

17. The method of claim 16 further comprising the step of displaying the location of each of the plurality of submerged subsystems to a user on the human machine interface.

\* \* \* \* \*